June 19, 1923.

H. R. TROTTER

THRUST BEARING

Filed April 29, 1921

1,459,454

2 Sheets-Sheet 1

Henry R. Trotter
INVENTOR

BY D. C. David
ATTORNEY

June 19, 1923.

H. R. TROTTER

THRUST BEARING

Filed April 29, 1921

1,459,454

2 Sheets-Sheet 2

Henry R. Trotter
INVENTOR

BY D. C. Davis
ATTORNEY

Patented June 19, 1923.

1,459,454

UNITED STATES PATENT OFFICE.

HENRY R. TROTTER, OF SWARTHMORE, PENNSYLVANIA, ASSIGNOR TO WESTING-HOUSE ELECTRIC & MANUFACTURING COMPANY, A CORPORATION OF PENNSYLVANIA.

THRUST BEARING.

Application filed April 29, 1921. Serial No. 465,495.

*To all whom it may concern:*

Be it known that I, HENRY R. TROTTER, a citizen of the United States, and a resident of Swarthmore, in the county of Delaware and State of Pennsylvania, have invented a new and useful Improvement in Thrust Bearings, of which the following is a specification.

My invention relates to thrust bearings and has for its object to provide apparatus of the character designated which shall permit the transmission of a heavy thrust from a member rotating at relatively high velocity to a fixed thrust-receiving member.

Figure 1:
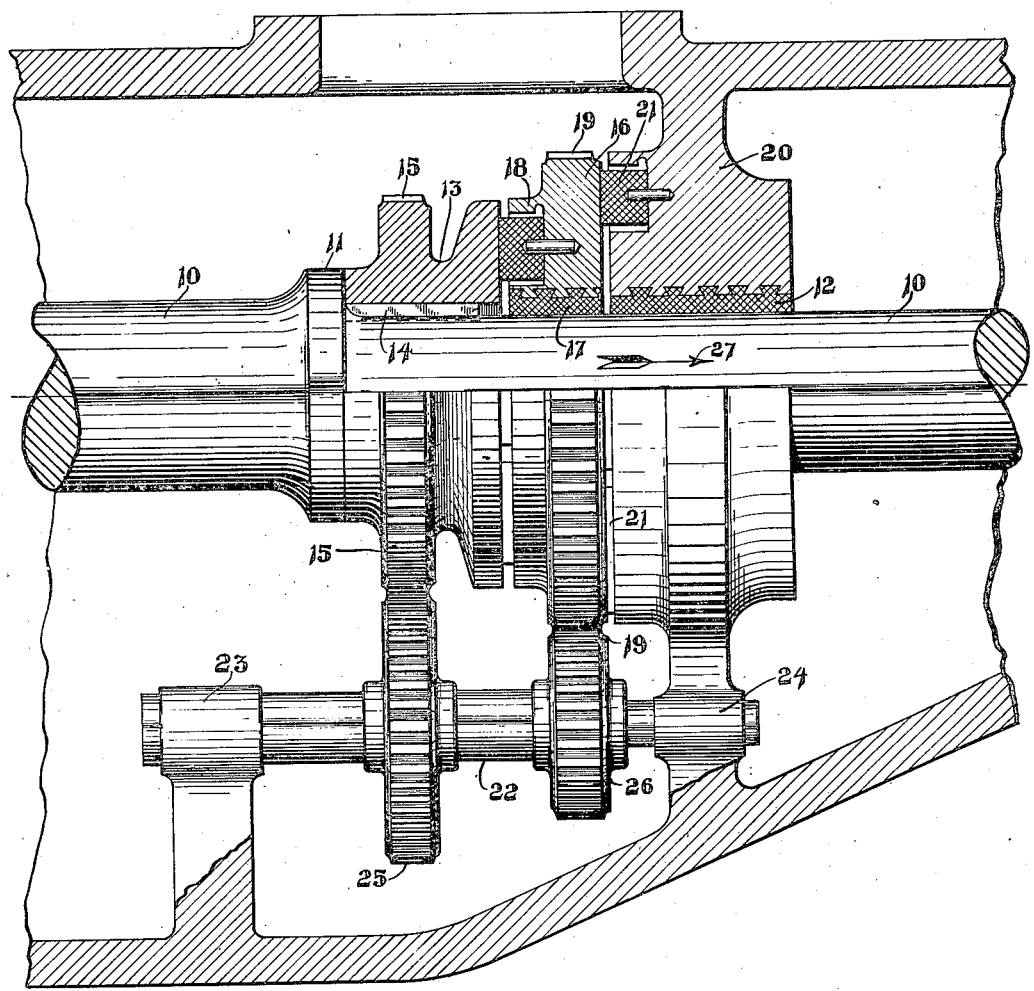
Figures 2, 3:
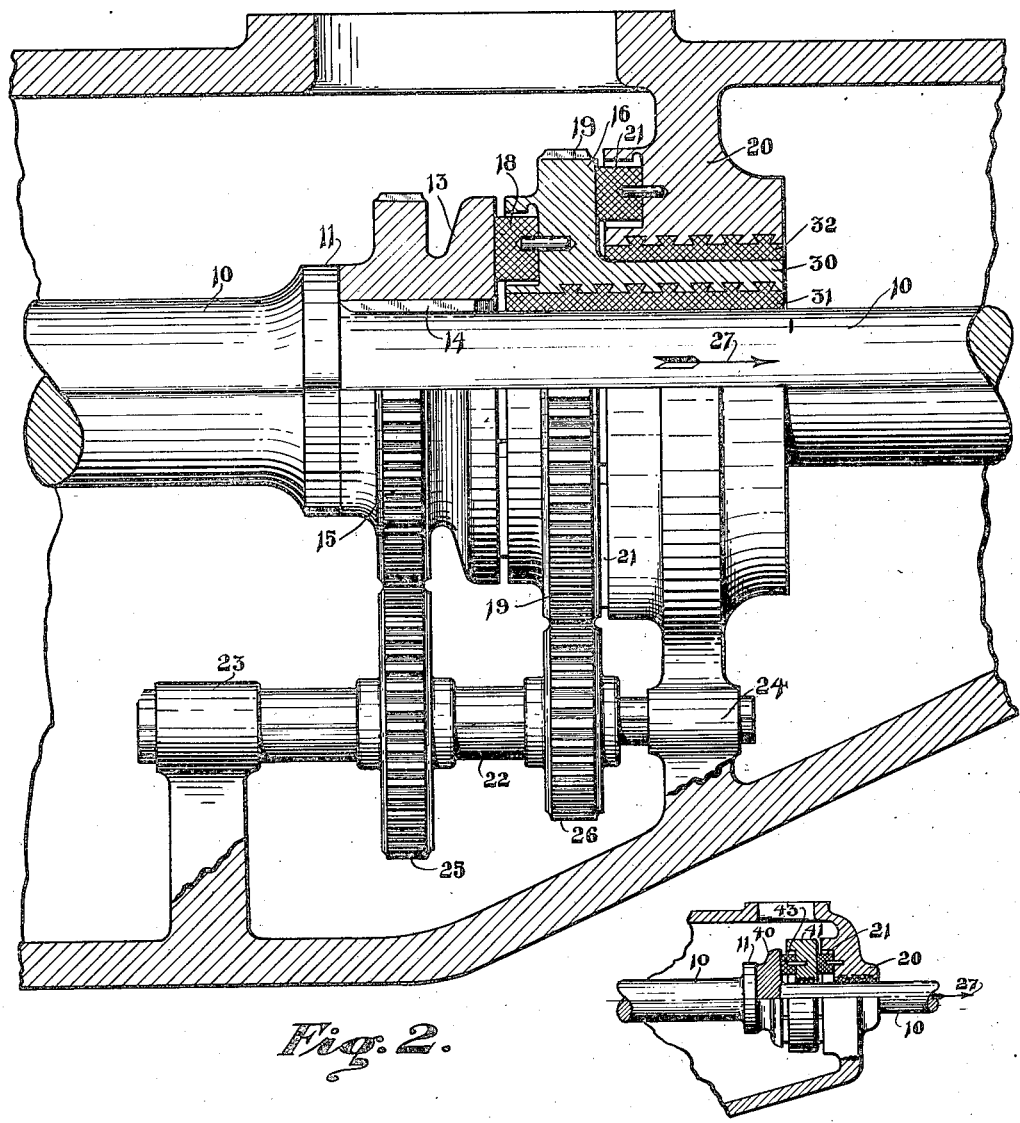

In the accompanying drawing, Figure 1 is a side view, partially in section and partially in elevation, of one form of apparatus embodying my invention; and Figures 2 and 3 are similar views illustrating modifications thereof.

In the manufacture of thrust bearings, it has been common practice, for some time, to transmit the thrust directly from the rotating body to fixed thrust-receiving means, either directly or through tiltably mounted shoes, establishing a wedge-shaped pressure receiving oil film, as in the well known Kingsbury thrust bearing. With the use of certain forms of machinery, however, such for example as high-speed, high-power steam turbines, it is found that at high rubbing velocities the load imposed upon a bearing, of the simple type above referred to, tends to become excessive, resulting in undue heating of the oil and in the destruction of the bearing members.

In accordance with the present invention, therefore, I subdivide the thrust-transmitting function into two or more parts, in that I transmit the thrust from the high-speed rotor to an intermediate member rotating at a relatively lower speed and I then transmit the thrust from this last-named member to the fixed thrust-receiving means. In this manner, the relative speed between any two opposed thrust-transmitting means is radically reduced and more favorable operating conditions are obtained.

Referring to the drawing for a more detailed understanding of my invention, I show a rotatable shaft at 10 in Figure 1, this shaft running at relatively high speed and with a heavy endwise thrust, as in a high-speed, high-power turbine not provided with dummies or other pressure-balancing means.

The shaft 10 is provided with a thrust-transmitting flange 11 and runs in a fixed shaft bearing 12 of any desired form. A thrust collar 13 is keyed to the shaft 10, as indicated at 14, and bears against the flange 11. This collar may be provided with teeth 15 forming an external gear thereon for a purpose to be hereinafter more fully described.

A supplemental thrust collar 16 is mounted for rotation upon the shaft 10, as shown at 17, and may carry tiltable thrust-receiving blocks 18 bearing against the face of the thrust collar 13, or, if desired, these thrust blocks may be omitted and the supplemental collar 16 may bear directly against the collar 13. The supplemental collar 16 is also provided with external teeth 19 so as to form a gear therearound.

A bracket 20 carries the main shaft bearing 12 and may be provided with tiltable thrust receiving blocks 21 bearing against the back of the supplemental collar 16 or, if desired, the bracket 20 may bear directly against the collar 16 through a suitable fixed bearing face.

A jack-shaft 22 is mounted in suitable bearings 23 and 24 and carries a gear 25 meshing with the teeth 15 on the collar 13 and also a gear 26 meshing with the teeth 19 on the collar 16, the relative gear ratios preferably being such that the supplemental collar 16 is driven in the same direction as the shaft 10 and at substantially one-half the speed thereof.

Having thus described the arrangement of one form of apparatus embodying my invention, the operation thereof is as follows: The shaft 10 rotates at high speed and with the development of high thrust in the direction of the arrow 27. The supplemental collar is driven in the same direction and at substantially one-half the speed through the gear train and thus the relative velocity between the bearing surface of the shaft collar 13 and the tilting blocks 18 is only one-half that which would be present were the shaft collar 13 to bear directly against the fixed thrust-receiving member, as is the present practice.

The thrust received by the blocks 18 is transmitted through the supplemental collar 16 and to the fixed blocks 21, the relative velocity in this latter case also being substantially one-half that which would be present were the thrust transmitted directly from the rotor to a fixed member.

By the use of this tandem arrangement of thrust blocks, it follows that there is at no point such excessive relative velocity combined with high pressure as to over-stress the metal or to over-heat the oil which may be provided to the faces of the thrust blocks 18 to provide a wedge-shaped oil film of the well known type.

Referring to the form of my invention shown in Figure 2, the general arrangement is as shown in Figure 1, with the exception that the supplemental collar 19 carries an annular flange or collar 30 extending along the shaft for a considerable distance and providing a main shaft bearing 31, this latter bearing also centering the supplemental collar 16. The shaft bearing 32 carried by the bracket 20 does not contact directly with the shaft 10 but rather bears against the outer surface of the collar member 30 so that not only is there a reduced relative velocity of the opposed parts in each portion of the thrust bearing but also the relative velocities in the shaft bearing itself are cut in half, in that the relative velocity between the shaft 10 and the bearing 31 is substantially one-half that obtained between the shaft 10 and the bearing 12 of the device, as shown in Figure 1 and, in like manner, the relative velocity between the member 30 and the bearing 32 is substantially only one-half of that obtaining between the shaft 10 and bearing 12 in Figure 1. Thus, by the elimination of extremely high velocity between the bearing members, an exceptionally reliable bearing is provided for the severe service contemplated.

In the form of my invention shown in Figure 3, the shaft flange 11 bears against a thrust collar 40 keyed to the shaft and the thrust is transmitted from the collar to a supplemental collar 41 journaled on the shaft at 42 for free rotation and carrying thrust blocks 43.

The supplemental collar 41, in turn, bears against thrust shoes 21 carried by the fixed casing.

Thus, it will be seen that the supplemental collar 41 is free to float at an intermediate speed, so to speak, and if the two sets of thrust shoes are of similar design and mean radius, the supplemental collar 41 tends to run at substantially one-half the speed of the shaft, thus providing a relatively low rubbing velocity on each set of thrust shoes.

It will be obvious to those skilled in the art that my invention is susceptible of further extensions, in that two or more supplemental thrust collars may be provided, each rotating or being driven at a different speed so that the high velocity thrust may be stepped down to a thrust against a fixed member in three or more steps, suitable gearing being chosen to provide for the necessary relative velocities.

While I have shown my invention in but two forms, it will be obvious to those skilled in the art that it is not so limited but is susceptible of various other changes and modifications without departing from the spirit thereof, and I desire, therefore, that only such limitations shall be placed thereupon as are imposed by the prior art or as are specifically set forth in the appended claims.

What I claim is:

1. In a thrust bearing structure, the combination with a rotatable shaft carrying a shaft thrust collar, of a rotatably mounted supplemental thrust collar provided with tiltably mounted thrust blocks bearing against said shaft collar, fixed thrust-receiving means provided with tiltable thrust blocks bearing against the back of said supplemental thrust collar, and means for rotatably driving said supplemental collar at a speed other than that of said shaft.

2. In a thrust bearing structure, the combination with a rotatable shaft carrying a shaft thrust collar, of a rotatably mounted supplemental thrust collar provided with tiltably mounted thrust blocks bearing against said shaft collar, fixed thrust-receiving means provided with tiltable thrust blocks bearing against the back of said supplemental thrust collar, and means for rotatably driving said supplemental collar in the same direction as said shaft but at a different speed from that thereof.

3. In a thrust bearing structure, the combination with a rotatable shaft carrying a shaft thrust collar, of a rotatably mounted supplemental thrust collar provided with tiltably mounted thrust blocks bearing against said shaft collar, fixed thrust-receiving means provided with tiltable thrust blocks bearing against the back of said supplemental thrust collar and means for rotatably driving said supplemental collar in the same direction as said shaft and at a speed bearing a predetermined ratio to the speed of said shaft.

4. In a thrust bearing structure, the combination with a rotatable shaft carrying a shaft thrust collar, of a rotatably mounted supplemental thrust collar provided with tiltably mounted thrust blocks bearing against said shaft collar, fixed thrust-receiving means provided with tiltable thrust blocks bearing against the back of said supplemental thrust collar and means for rotatably driving said supplemental collar in the same direction as said shaft and at a speed of substantially one-half that of said shaft.

5. In a thrust bearing structure, the combination with a rotatable shaft carrying a shaft thrust collar, of a rotatably mounted supplemental thrust collar provided with tiltably mounted thrust blocks bearing against said shaft collar, fixed thrust-receiving means provided with tiltable thrust blocks bearing against the back of said supplemental thrust collar, and a gear connection between said shaft and said supplemental collar, whereby the latter is turned at a predetermined relative speed with respect to that of said shaft.

6. In a thrust bearing structure, the combination with a rotatable shaft carrying a shaft thrust collar, of a rotatably mounted supplemental thrust collar provided with tiltably mounted thrust blocks bearing against said shaft collar, fixed thrust-receiving means provided with tiltable thrust blocks bearing against the back of said supplemental thrust collar, and a gear connection between said shaft and said supplemental collar, whereby the latter is turned in the same direction as said shaft and at substantially one-half the speed thereof.

In testimony whereof, I have hereunto subscribed my name this 28th day of April, 1921.

HENRY R. TROTTER.